No. 619,286. Patented Feb. 14, 1899.
T. J. DUNLEA.
COMPUTING SCALE.
(Application filed Aug. 23, 1897.)

(No Model.) 4 Sheets—Sheet 1.

INVENTOR
Thomas Joseph Dunlea.
BY
Smith & Denison
ATTORNEYS.

WITNESSES:

No. 619,286. Patented Feb. 14, 1899.
T. J. DUNLEA.
COMPUTING SCALE.
(Application filed Aug. 23, 1897.)
(No Model.) 4 Sheets—Sheet 2.

WITNESSES
Thomas J Mangan

INVENTOR
Thomas Joseph Dunlea.
BY
Smith & Arnison
ATTORNEYS.

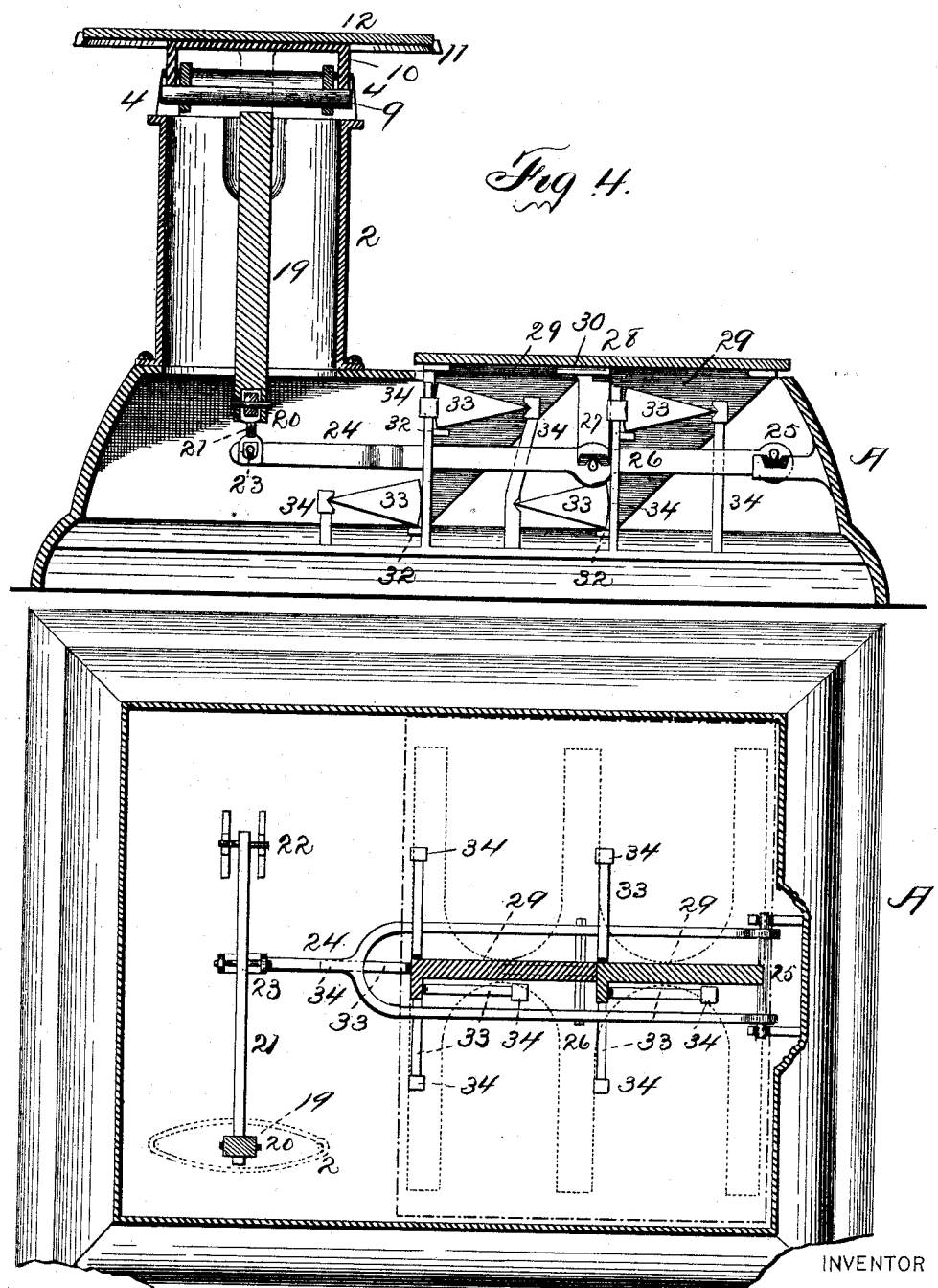

No. 619,286. Patented Feb. 14, 1899.
T. J. DUNLEA.
COMPUTING SCALE.
(Application filed Aug. 23, 1897.)
(No Model.) 4 Sheets—Sheet 4.
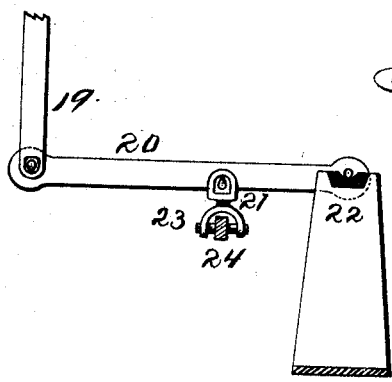
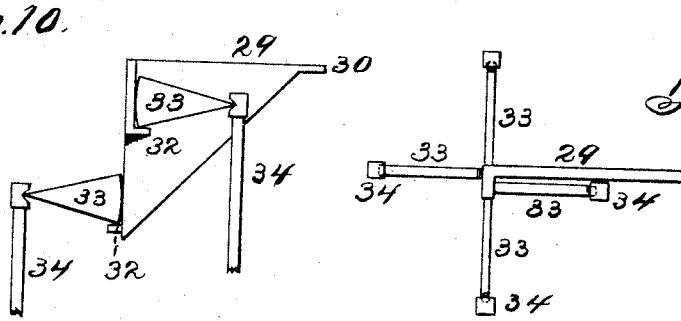
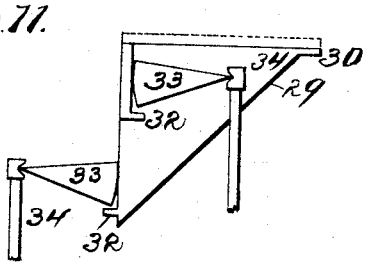
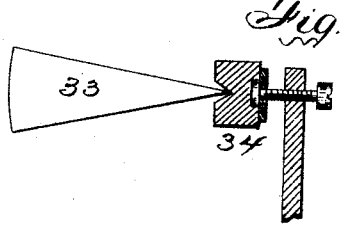
WITNESSES:
INVENTOR
Thomas Joseph Dunlea.
BY
Smith & Armson
ATTORNEYS.

UNITED STATES PATENT OFFICE.

THOMAS JOSEPH DUNLEA, OF BINGHAMTON, NEW YORK.

COMPUTING-SCALE.

SPECIFICATION forming part of Letters Patent No. 619,286, dated February 14, 1899.

Application filed August 23, 1897. Serial No. 649,157. (No model.)

*To all whom it may concern:*

Be it known that I, THOMAS JOSEPH DUNLEA, of Binghamton, in the county of Broome, in the State of New York, have invented new and useful Improvements in Computing-Scales, of which the following, taken in connection with the accompanying drawings, is a full, clear, and exact description.

My invention relates to computing-scales.

My object is to produce a compound computing-scale provided with two tables which bear a fixed ratio the one to the other, one being used up to a certain weight and the other for all greater weights. It is further provided with a single scale-beam, which normally balances both tables simultaneously and is capable of being operated by them jointly or separately. This scale-beam is further provided with a series of swinging poises or weights, which are independently or separately operated to vary to the preponderance of the beam according to the distance one or more of said poises is swung outward toward the outer end of said beam beyond a fixed or normal point, so that when all of them are normal the beam balances. This normal point is fixed by the outer edge of a price-per-pound bar at a right angle to the beam, and each poise is graduated to pounds and ounces and is provided with tables of cost for pounds and ounces according to the price per round upon the rate-bar, whereby each poise performs the compound function of a variable weight upon the scale-beam and a cost-table. A single set of bearings is provided common to both tables and to the single scale-beam. It is constructed as follows, reference being had to the accompanying drawings, in which—

Figure 1:
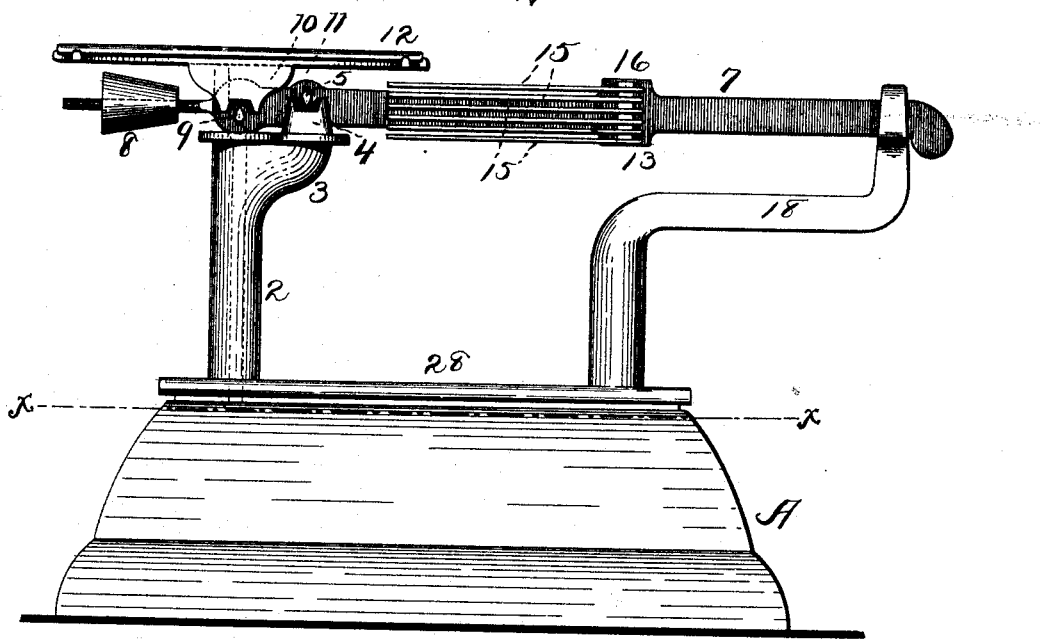
Figure 2:
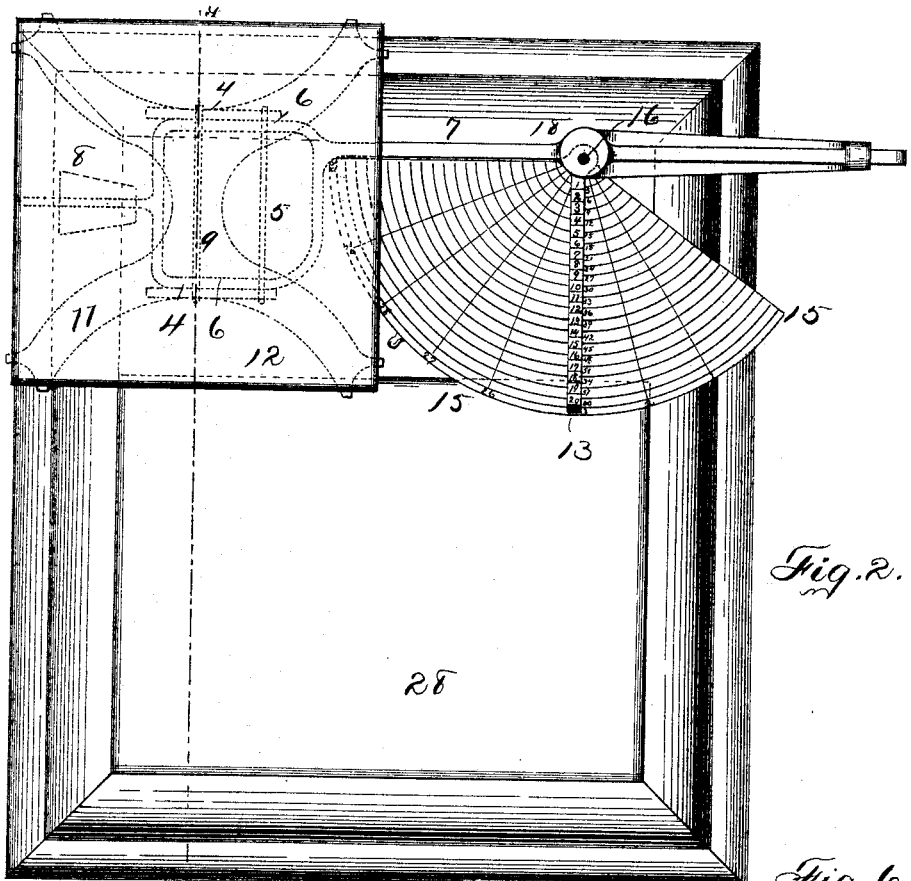
Figure 6:
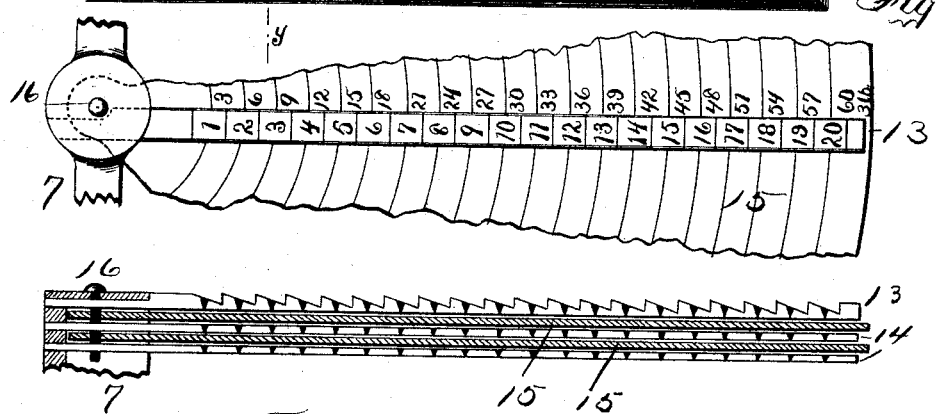
Figure 7:

Figure 1 is a front elevation of the scale. Fig. 2 is a top plan thereof. Fig. 3 is a horizontal section on line *x x* in Fig. 1. Fig. 4 is a vertical section on line *y y* in Fig. 2. Fig. 5 is an enlarged top plan of one of the poises. Fig. 6 is an enlarged top plan of part of the scale-beam, the rate-bar, and part of one of the poises. Fig. 7 is a vertical section of the same along the outer edge of the rate-bar and showing in elevation and section the guide-bars and a pair of poises in section. Fig. 8 is a detail of the mounting of standard of the primary table upon the universal bar. Fig. 9 is a top plan of one of the compound bearings directly under and supporting the secondary table. Fig. 10 is an elevation of one member of one of said bearings, showing its component parts in their normal position. Fig. 11 is a like view of the same, showing them in the positions they assume when an article to be weighed is placed upon either table. Fig. 12 is a sectional detail illustrating an adjustable bearing-point of one of the members of the compound bearing.

A is a suitable base upon which a hollow standard 2, having an offset 3, is erected, and 4 4 are bearing-studs erected thereon, adapted to suitably receive the bearing-bar 5, knife-edged or otherwise suitably constructed to perform the function of a fulcrum for the arms 6 of the scale-beam 7, the inner end of which is broadened into substantially an open square or rectangle, to which the scale-beam body is secured (or integral with) at one side of the center, while the adjustable balance-weight 8 is on the center or out of longitudinal alinement with the scale-beam body.

At 9 another fulcrum-bar is suitably mounted in the inner end of the scale-beam, with its knife-edge or other bearing face uppermost to suitably engage with the lugs 10 upon the spider 11 and support it. Upon the diverging arms of this spider the primary weighing-table 12 is suitably mounted, its center line being also out of alinement with the scale-beam body. This special mounting of the inner end of the scale-beam and of the table thereon is that the center line of the table may be more positively in the line of the force exerted by the weight or poise upon the scale-beam, as hereinafter more fully explained. At a suitable point in the scale-beam body it is provided with a suitable number of parallel lateral arms 13 14, suitably and rigidly secured thereto, as at a right angle, the arm 13 being the rate-per-pound bar, as shown in Fig. 6, and its upper face can be formed in a series of inclined steps, as shown in Fig. 7. Also the outer edges of all of these bars are provided with a series of arrows or other marks to aid the eye in reading the values at each rate, as hereinafter explained. Between these reading-bars, which also serve as guides, the swinging poises 15 are suitably pivoted, as at 16, in alinement with their outer edges, as seen in Fig. 6. These poises are of quadrant shape and are here shown as divided by radial lines into five compartments 17, each of which represents five pounds, each being also subdivided by concentric arcs creating lines which are subdivided into ounce divisions, said division-marks being also upon radial lines, and in each of such divisions figures are tabulated, representing the cost of several ounces at each of the rates shown upon the rate-bar. In Fig. 6 the value of three pounds is shown at each of the rates shown from one cent up to twenty cents per pound. This and Fig. 2 also represent the lowermost poise swung around to the right to bring the three-pound radial line in line with the right-hand or outer edge of the rate-bar, and illustrates the principle of the cost-tabulations upon the poises. As here shown, the poises are arranged in series of five pounds, each one representing that weight upon the scale-beam when fully swung out, the lower one indicating from one to five pounds, the second from five to ten pounds, and the six poises shown, therefore, indicate thirty pounds upon the scale-beam, and that also indicates the limit of the capacity for weighing of the primary table. In their normal positions these poises and scale-beam are balanced, and as the force exerted by them is at one side of said beam so the inner end thereof and said table are mounted to resist the torsional force exerted by them upon said beam. As each poise is swung outward its projection as defined by the distance beyond the outer edge of the rate-bar indicates the weight thus actually applied to the scale-beam either in pounds or pounds and ounces, being varied according to the degree of such swing of one or more poises beyond the normal line—the outer edge of the rate-bar. A suitable upright 18, erected upon the bed, guides and regulates the vertical vibrations of the scale-beam, which is inserted through a mortise or notch therein.

A suitable vertical stem 19, below the primary table, is suitably coupled or hinged, as at 20, to a horizontal beam 21, having one end suitably pivoted or hung at 22 and having suitable intermediate bearing at 23 upon the forked universal bar 24, the arms of which are suitably pivoted or hung at 25 and which have a suitable transverse intermediate bearing 26, which supports the legs 27 of the secondary table 28. Suitably connected to the under side of this table are transverse flanges or plates 29, (here shown as triangular,) arranged in alinement, one having a lip 30 engaging with a recess or ledge upon the other. At suitable points upon these flanges are ledges 32, which support the several bearing-segments 33, the apices of which have their bearings in suitable recesses upon uprights 34, erected upon the base. These segments are shown in their normal positions in Fig. 10 and in their relative positions under load in Fig. 11, rocking upon their arc ends. These segments are arranged to bear against each flange from four points, as shown in Fig. 9.

Their positions are controlled by the scale-beam and poises through the universal bar, by which they are maintained in equipoise. Their quadrilateral arrangement performs the function of steadying the secondary table against lateral strains and causes them to always maintain this table level even though the load may be applied upon one corner or at any other point, because the depression of the table always rocks all of them equally. As here shown, the secondary table is for weighing heavy articles above the limit of the primary table, and I have accordingly established a decimal ratio of one table to the other by which while the limit of the primary table is thirty pounds that of the other is three hundred pounds, using the primary table for small weights only up to said limit. At the same time a weight applied to the one will proportionally operate the other.

The same rate-bar and price-tables are applicable to the secondary table by simply multiplying the pound-prices by ten—as, for instance, while three pounds at twenty cents amounts to sixty cents, thirty pounds will amount to six dollars.

It will be seen that the limit of the first (lowest) poise—five pounds—is not reached until it is swung clear out, and thereafter the least movement of the next poise adds to this, according to the distance it is swung out, until the limit of its swing and force is reached at ten pounds, and so on for each successive poise. It will also be seen that each poise indicates the actual weight of the article and also its value at any one of the rates on the rate-bar.

Having described my invention, what I claim, and desire to secure by Letters Patent, is—

1. In a scale, the combination with a scale-beam widened at its inner end and on one side only, and a weighing-table upon and coincident with said widened end whereby it is out of alinement with the outer end of said beam, of a swinging poise pivoted at one end upon said beam and normally folded back against it toward said table to balance the scale, and indicating weight according to the extent of its outward swing from its normal position.

2. In a scale, the combination with a scale-beam widened at its inner end and on one side only, and a weighing-table upon and coincident with said widened end, whereby it is out of alinement with the outer end of said beam, of a rate-bar secured upon and at a right angle to said beam, and a swinging poise pivoted at one end upon and normally folded back against said beam toward said table to balance the scale, and indicating weight according to its projection beyond the edge of the rate-bar.

3. In a scale, the combination with a scale-beam having its inner end broadened laterally on one side, beyond its longitudinal line, of a weighing-table mounted upon said broadened inner end and out of alinement with the outer end of said beam.

4. In a scale, the combination with a scale-beam, and a rigid laterally-projecting rate-bar thereon, provided with a table of rate-per-pound prices, of a series of guide-bars parallel to said rate-bar, and a series of poises mounted to swing between said bars and graduated with pounds and ounces and tabulations of prices, multiples of the several rates and weights, brought into alinement with the outer edge of said rate-bar by the swing of a poise.

5. In a scale, the combination of a scale-beam provided with a pocket in its side, and a pivot-pin intersecting the outer end of said pocket, a rate-bar projecting from said beam in alinement with said pivot, and a poise mounted upon said pivot and normally folding back into said pocket, and whereby the gravity of said beam is varied according to the removal of said poise from its pocket and its projection beyond said rate-bar.

6. In a scale, the combination with a base, standards erected thereon, substantially in a rectangle and each provided with a bearing point or points, of a table, a vertical bearing-plate thereon, and segmental rockers each having its large end bearing upon said plate and a bearing at its apex in one of said bearing-points upon said standards, creating a quadrilateral bearing-support for said table.

7. The combination with a scale-beam and a stationary rate-bar at an angle thereto, of a poise movable upon said beam relative to said bar without sliding thereon, to exert a variable force thereon and adapted to indicate pounds, ounces and values according to the rates upon the rate-bar determined by the position of said poise relative to the rate-bar and scale-beam.

In witness whereof I have hereunto set my hand this 11th day of August, 1897.

THOMAS JOSEPH DUNLEA.

In presence of—
  THOMAS J. MANGAN,
  JOHN J. IRVING.